United States Patent [19]

Abe et al.

[11] 4,320,041
[45] Mar. 16, 1982

[54] AQUEOUS DISPERSION OF OLEFIN RESINS AND CONTINUOUS PROCESS FOR PREPARING THEREOF

[75] Inventors: Katsuhiro Abe; Mitsuo Tsuruoka; Shigeki Kiriyama; Kazunobu Nakamori, all of Yokkaichi, Japan

[73] Assignee: Mitsubishi Petrochemical Co., Ltd., Tokyo, Japan

[21] Appl. No.: 160,791

[22] Filed: Jun. 19, 1980

[30] Foreign Application Priority Data

Jun. 19, 1979 [JP] Japan .................................. 54/76325

[51] Int. Cl.³ ............................................. C08L 29/04
[52] U.S. Cl. ................................. 524/503; 264/176 R; 264/185; 264/349
[58] Field of Search ................... 260/29.6 RW, 29.6 B; 264/185, 349, 176 R

[56] References Cited

U.S. PATENT DOCUMENTS

| | | | |
|---|---|---|---|
| 3,300,460 | 1/1967 | Vacca | 260/29.6 B |
| 3,356,629 | 12/1967 | Smith et al. | 260/29.6 PM |
| 3,708,388 | 1/1973 | Lindemann et al. | 260/29.6 B |
| 3,925,289 | 12/1975 | Sakato et al. | 260/29.6 B |
| 4,001,160 | 1/1977 | Lindemann | 260/29.6 B |
| 4,043,961 | 8/1977 | Beresiewicz et al. | 260/29.6 RW |
| 4,126,729 | 11/1978 | Richardson et al. | 260/29.6 RW |
| 4,201,802 | 6/1980 | Vande Kieft | 260/29.6 B |

*Primary Examiner*—John Kight, III
*Assistant Examiner*—Amelia B. Yarbrough
*Attorney, Agent, or Firm*—Sughrue, Mion, Zinn, Macpeak & Seas

[57] ABSTRACT

Aqueous dispersions of olefin resins having a low film-forming temperature can be continuously produced by homogeneously mixing a mixture composed of olefin resin, partially saponified polyvinyl alcohol and water by means of an extruder having a multi-screw, and extruding the resulting dispersion.

If partially saponified polyvinyl alcohol in which residual acetic acid groups are blocked is used, the film-forming temperature thereof is effectively lowered.

20 Claims, 2 Drawing Figures

AQUEOUS DISPERSION OF OLEFIN RESINS AND CONTINUOUS PROCESS FOR PREPARING THEREOF

BACKGROUND OF THE INVENTION

1. Field of the Invention

This invention relates to resin dispersions, and particularly to an aqueous dispersion of olefin resins and a continuous process for the preparation thereof.

2. Description of the Prior Art

Known processes for preparing aqueous dispersions of olefin resins include processes using suspension polymerization or emulsion polymerization, e.g., a process including formation of an aqueous dispersion of ethylenevinyl acetate copolymer, and an after-dispersion process, which comprises dispersing a polymer formed by polymerization in water after carrying out the polymerization.

Aqueous dispersions prepared by suspension polymerization or emulsion polymerization are limited to polymers produced by radical polymerization. Furthermore, in the case of polymers having 70% by weight or more olefin content, the pressure during polymerization becomes remarkably high, namely, serveral hundred to several thousand $Kg/cm^2$, because of the reactivity of the monomers. Therefore, from the industrial stand point aqueous dispersions of olefin resins obtained by this process have been limited to ethylene-vinyl acetate copolymer having, at most, 40% by weight or less ethylene content as described in, for example, Kobunshikako, page 5, July 18, 1977 (Japan).

On the contrary, since the after-dispersion process is the process which comprises dispersing a polymer obtained by a polymerization reaction in water after carrying out the polymerization reaction, it is not limited by the polymerization process, and it is possible to obtain aqueous dispersions of various polymers so as to have an olefin content from a low value to a high value.

The after-dispersion process includes various particular processes. Typical after-dispersion processes include a process which comprises dispersing a polymer in a fused state in hot water containing an emulsifying agent by means of a high-shear stirrer, such as a homomixer, etc. which is used for preparing an aqueous dispersion of polyethylene wax having a low molecular weight as described in, for example, Japanese Patent Application (OPI) No. 44146/76, and a process which comprises dissolving a polymer in an organic solvent, mixing the resulting solution with water containing an emulsifying agent, emulsifying by means of a high-shear stirrer, such as a kneader or a homogenizer, and evaporating the solvent from the resulted emulsion to obtain an aqueous dispersion of the polymer. The former process is not a process capable of general use, because it is difficult to apply to polymers having a high molecular weight and a large viscosity. Namely, in order to uniformly disperse the fused polymer in hot water by means of a high-shear stirrer, it is necessary to reduce the viscosity as low as possible. In case of resins having a high molecular weight and a high melt viscosity, however, the temperature to which the resin must be heated is very high and it is necessary for the whole system to have a high temperature and a high pressure. Consequently, the apparatus becomes large in scale, and the process is not suitable for practical use. In the latter process, also using the organic solvent, a step for removing the solvent after dispersion is required, and removal of the solvent while preventing foaming is technically difficult.

As a modified process of the latter process using the organic solvent, it has been proposed to continuously feed a resin to a hopper of a monoaxial screw extruder while continuously feeding an organic solvent and water containing an emulsifying agent to a feed inlet provided in a compression zone of the extruder, heating and kneading the resin in the extruder, and subsequently extruding while blending with the organic solvent and water in the amount at least 17% by weight which contains an emulsifying agent, as described in U.S. Pat. No. 3,356,629. However, in this process, the dispersion of the resin is insufficient, and a homogenous dispersion can not be obtained if the dispersing is not carried out by a high-speed stirrer together with the further addition of a large amount of water to the extruded product. Further, this process is also defective in that a step for removing the organic solvent is required, because use of a solvent is essential and a large amount of the solvent is used.

SUMMARY OF THE INVENTION

As a result of studies for developing a process for dispersing easily and continuously olefin resins in water without being influenced by melt viscosity of olefin resins in order to develop an improved process which overcomes the above-described defects of the prior processes for producing aqueous dispersions of olefin resins, it has now been discovered that this object can be achieved by mixing an olefin resin with an aqueous solution of partially saponified polyvinyl alcohol in an extruder to continuously extrude said mixture, using a multi-screw extruder as the extruder, and partially saponified polyvinyl alcohol having a specified saponification value as an emulsifying agent, according to specified process steps.

Namely, this invention provides a process for continuously preparing aqueous dispersions of olefin resins which comprises continuously feeding an olefin resin into a hopper of a multi-screw extruder, continuously feeding an aqueous solution of partially saponified polyvinyl alcohol having from about 65 to 95 mol % of the saponification value under pressure to at least one feed inlet provided in at least one of a compression zone and a metering zone of said extruder, heating and mixing said olefin resin in said extruder, and subsequently mixing it with said aqueous solution.

Another object of the present invention is to provide aqueous dispersions of olefin resins having a low film-forming temperature, namely, aqueous dispersions of olefin resins composed of (A) olefin resin particles having 5 microns or less of the average particle size, (B) partially saponified polyvinyl alcohol and (C) water, wherein the component B) is from 2 to 35 parts by weight and the component (C) is from 30 to 1000 parts by weight based on 100 parts by weight of the resin particles of component A).

Figures 1, 2:
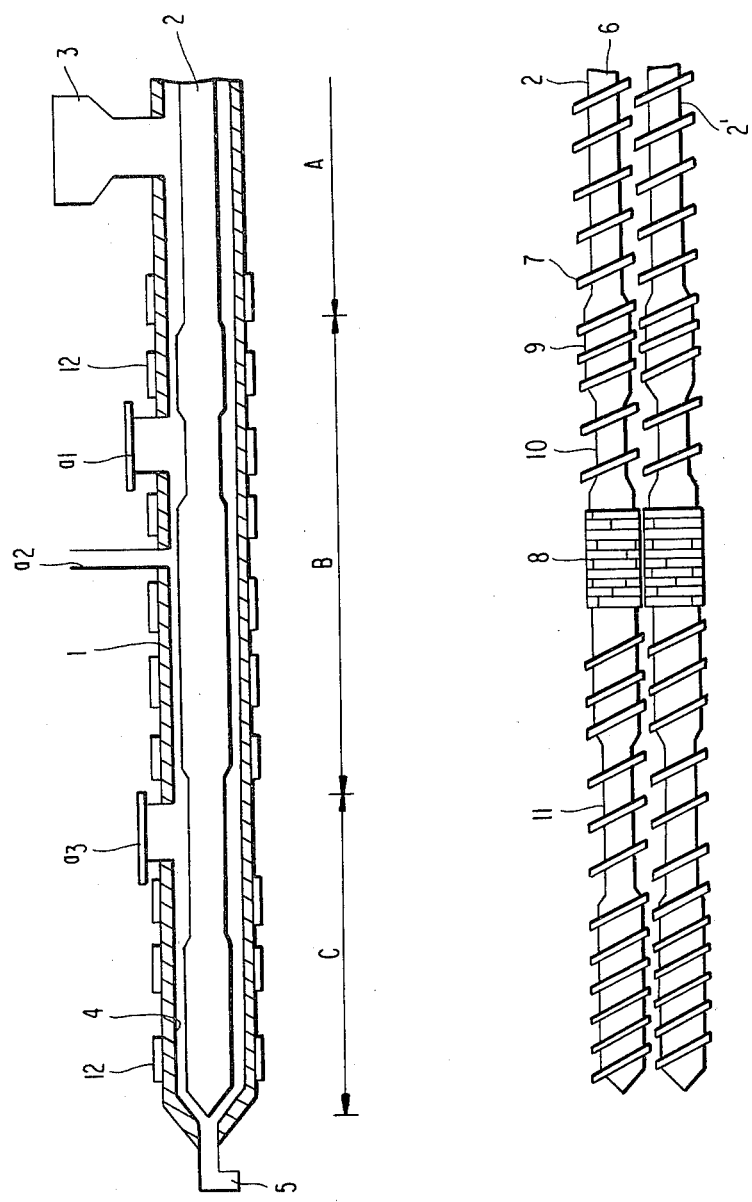
FIG. 1 is a partial cross-section view from the side of a biaxial extruder used in the example of the present invention.
FIG. 2 is an overhead view of two screws positioned in an extruder as in FIG. 1.

In the drawings, 1 is an extruder, 2 and 2' are extruder screws, 3 is a hopper, 8 is a kneading disk, A is a feed zone, B is a compression zone, C is a metering zone, and a₁, a₂ and a₃ are feed inlets for liquid.

DETAILED DESCRIPTION OF THE INVENTION

Although details of mechanism to indicate why aqueous dispersions of olefin resins having 30 wt% or more of water content can be easily formed by the above process of the present invention are not completely understood, it is believed that the olefin resin is first heated and mixed to form a semifused or fused state, and is then mixed with the aqueous solution of partially saponified polyvinyl alcohol fed to at least one of the compression zone and the metering zone, by which said resin is dispersed in said aqueous solution to form an oil/water type dispersion as a function of the surface tension and the shearing force between the screw and the barrel or between adjacent screws.

The extruder used in the present invention is a multi-screw extruder and, preferably, twin screw extruder. The multi-screw extruder is necessary to have a common hopper (namely, solid resin feed inlet) and at least one liquid feed inlet provided on the compression zone and/or the metering zone. Further, since it is preferred that the extruder has a high shearing force, it is preferred that the ratio L/D (L is the effective length of the screw and D is the effective inner diameter of the barrel) is 15 or more. Further, since the resin changes from a fused state having a high viscosity into an aqueous dispersion having a low viscosity in the extruder, it is preferred that the extruder be capable of extruding even low viscosity liquids. Such extruder includes, for example, a co-rotating, intermeshing type twin screw extruder which has a two flighted screw or three flighted screw profile (ZSK Series, products of Werner & Pfleidere Co.; TEN Series, products of Toshiba Kikai Co.; PCM Series, products of Ikegai Tekko Co.); a counter-rotating, intermeshing type twin screw extruder (GTR Series, products of Ikegai Tekko Co.); a counter-rotating, non-intermeshing type twin screw extruder (FCM Series, products of Ferrel Co.); and so forth.

A particularly preferred extruder is a co-rotating, intermeshing type twin screw extruder. Such an extruder, as is shown in FIG. 1 and FIG. 2, is provided with kneading discs 8 on screw parts situated at the compression zone B so as to form a strongly kneading part. In the drawings, 1 is an extruder, 2 and 2' are screws, 3 is a hopper, 4 is a barrel, t is a nozzle, 6 is a screw shaft, 7 is a flight, 8 is a kneading disc, 9 is a compression part, 10 and 11 are vent parts, A is a feed zone, B is a compression zone, C is a metering zone, a₁, a₂ and a₃ are liquid feed inlets and 12 is a heater.

The olefin resin fed into the hopper 3 is sent from the feed zone A by rotating of screws 2 and 2' to the compression zone B, where the resin is transformed to a semifused state by means of the heater 12 and the shear forces between the screws 2 and 2' and the barrel and/or between the screw 2 and the screw 2'. The resin is fused in the metering zone C and extruded continuously from the nozzle 5 as a dispersion. When the resin is in the semifused or fused state, an aqueous solution of partially saponified polyvinyl alcohol is fed through at least one of the liquid feed inlets a₁, a₂ and a₃, and the mixture is homogeneously mixed by rotating of the screws 2 and 2' and conveyed towards the nozzle 5.

The olefin resin that can be in this invention include, for example, low-density polyethylene, middle-density polyethylene, high-density polyethylene, ethylene-vinyl acetate copolymer, ethylene-acrylic acid copolymer, metal salts of ethylene-acrylic acid copolymer, ethylene-methacrylic acid copolymer, ethylene-acrylic acid ester copolymer, ethylene-methacrylic acid ester copolymer, ethylene-propylene copolymer, atactic polypropylene, isotactic polypropylene, propylene-1-butene copolymer, ethylene-propylene-dicyclopentadiene copolymer, ethylene-propylene-ethylidenenorbornane, and mixtures of these copolymers.

Among them, ethylenic resins having a melt flow ratio of 30g/10 minutes or more measured by ASTM D-1238-70, including particularly ethylene-vinyl acetate copolymers comprising from 15 to 40 wt % vinyl acetate content are preferred because they provide aqueous dispersions having a low film-forming temperature.

In the invention the olefin resin is fed into the hopper of the multi-screw extruder. In this case, the olefin resin may be fed alone or may be fed as a mixture together with a small amount of one or more suitable modifying agents, for example, rosin, petroleum resin, or polyamide, etc., as agents for providing an adhesive property. Furthermore, the olefin resin may be fed together with a small amount of other resins, such as olefin copolymers modified with acrylic acid or maleic acid anhydride, etc., for various purposes.

Furthermore, it is possible, if desired, to feed the olefin resin into the hopper of the extruder as a mixture thereof with a small amount, i.e., less than 5% by weight, and preferably, 3% by weight or less of the same partially saponified polyvinyl alcohol as is fed as the aqueous solution to the compression zone and/or the metering zone of the extruder.

The partially saponified polyvinyl alcohol fed as an aqueous solution by feed inlets provided in at least one of the compression zone and the metering zone of the multi-screw extruder in this invention has from about 65 to 95 mol %, and preferably from 70 to 90 mol % of the maximum saponification value. When the saponification value is in the above described range, it shows an excellent effect for dispersing the olefin resin in water, by which a homogeneous aqueous dispersion can be obtained. However, if the saponification value is more than the above-described range, the effect for dispersing deteriorates, while if it is less than the above-described range, the solubility in water becomes low, and consequently the effectiveness dispersing the olefin resin in water deteriorates.

The partially saponified polyvinyl alcohol (PVA) that can be used include (i) those in which residual acetic acid groups are distributed at random in the molecule, which are produced by adding an aqueous solution of alkali to a solution of polyvinyl acetate, used as a dispersing agent, in alcohol, to saponify the polyvinyl acetate, and (ii) those in which residual acetic acid groups are blocked in the molecule, which are produced by dissolving polyvinyl acetate having a degree of polymerization from 500 to 3000 in a 2:1 to 1:2 (ratio by weight) mixture of alcohol or acetone and a hydrocarbon solvent such as benzene, and adding a suitable amount of an aqueous solution of alkali to saponify the polyvinyl acetate.

However, the latter partially saponified polyvinyl alcohol in which residual acetic acid groups are distributed in a block form is preferred, because of having an effect of lowering the film-forming temperature of the aqueous dispersion. The latter PVA (ii) satisfies the following formula, wherein the saponification value is shown as x% and the melting point is shown as Tm, and is distinguished from the randomly distributed saponified polyvinyl alcohol.

$$0.50x + 179 \geq Tm \geq 1.18x + 73$$

Such partially saponified polyvinyl alcohol in which residual acetic acid groups are distributed in a block form in the molecule have been available on the market under the trade mark: #Kuraray Poval PVA-420 (saponification value: 80% by mol; degree of polymerization: 2000 and melting point: 174° C) produced by Kuraray Co. Ltd.

Furthermore, the former, partially saponified polyvinyl alcohol, in which residual acetic acid groups are distributed in random has been available on the market under the trade marks Gosenol KH-17, KH-20, C-500 and GH-17 produced by Nippon Synthetic Chemical Industry Co., Ltd.

When the above-described partially saponified polyvinyl alcohol (ii) is used and an ethylene-vinyl acetate copolymer comprising from 15 to 40% by weight of the vinyl acetate content which has 30 g/10 minutes or more, and preferably from 40 to 500 g/10 minutes of the melt flow ratio measured by ASTM D-1238 is used as the resin of the component (A), aqueous dispersions of the ethylene copolymer resin having 35° C. or less of the film-forming temperature can be obtained, which have an advantage that a continuous coating film can be formed at a room temperature without heating to dry.

In the case of using other dispersing agents such as methylethylcellulose, polyvinyl pyrrolidone or sodium dodecylbenzene sulfonate, etc. instead of the partially saponified polyvinyl alcohol used in the invention, a sufficient effect of forming homogeneous aqueous dispersions of olefin resin is not exhibited. However, these other dispersing agents may be used together with the partially saponified polyvinyl alcohol of the present invention. Though the reason why other dispersing agents do not show a sufficient effect for formation of aqueous dispersion of the olefin resin, while the partially saponified polyvinyl alcohol of the present invention shows an excellent effect, is not completely understood, it is believed that other dispersing agents are difficult to adsorb in the olefin resin because of having a large difference of surface tension (wetting) to the olefin resin and, consequently, a protective colloid cannot be obtained.

In the invention, such specified partially saponified polyvinyl alcohol is fed as an aqueous solution under pressure by at least one feed inlet provided on the compression zone and/or the metering zone of the multi screw extruder. Said feed inlets are preferred to be situated on the compression zone where the resin is in a semifused state and, particularly, the highly kneading part $$(\tau > 150 \text{ sec}^{-1}, \tau = \frac{\pi \cdot D \cdot N}{60 \cdot \Delta t},$$

wherein D is a caliber of screw (mm), N is a rotation number of screw (rpm) and $\Delta t$ is a gap of screw (mm))) wherein the resin pressure is 20 Kg/cm² or more where a high shear force is applied, rather than in the metering zone where the resin is fused. In the case of feeding the aqueous solution to the highly kneading part, finely dispersed resin particles having a fine particle size can be obtained, as compared to the case of feeding the aqueous solutions to the other parts. Two or more feed inlets for the aqueous solution may also be provided. In such a case, one or more of the feed inlets may be provided on the compression part or the kneading part of the compression zone and the others may be provided on the vent part of the compression zone or the metering zone. When the position of the feed inlet for the aqueous solution is on the feed zone, the viscosity of the mixture becomes so high as to bring about an excessive load for rotating of screws; heating to a fairly high temperature is required for preventing such a high viscosity.

The reason why partially saponified polyvinyl alcohol is fed under pressure in this invention is that it is hardly possible otherwise to feed the aqueous solution thereof to the compression zone and the metering zone because of the resin pressure. By comparison, if fed under a normal pressure. In order to continuously feed the aqueous solution at a fixed rate, it is preferred to introduce the partially saponified VA with pressure, at a pressure higher than the resin pressure at the feed inlet.

It is preferred that the concentration of partially saponified polyvinyl alcohol in the aqueous medium phase of the aqueous dispersion in the invention, namely, a ratio of partially saponified polyvinyl alcohol to water in the aqueous dispersion, is generally from 70 to 5% by weight, and preferably from 60 to 20% by weight. Generally, an aqueous solution of partially saponified polyvinyl alcohol having more than 70% by weight of the concentration is not preferred, because the viscosity thereof is too high, and the resulting dispersion itself would acquire a high viscosity. The aqueous solution having such a high concentration is difficult to continuously feed at a fixed rate to the feed inlets of the extruder because of its high viscosity. Further, an aqueous solution of partially saponified polyvinyl alcohol of a concentration of less than 5% by weight is sufficiently mixed with fused olefin resin in the extruder, because the difference of the viscosity thereof with respect to the fused olefin resin is too large. Since a part of partially saponified polyvinyl alcohol can be fed by the hopper of the extruder together with the olefin resin as described above (but less than 5% by weight based on the olefin resin), the concentration of the aqueous solution of partially saponified polyvinyl alcohol to be fed to at least one of the compression zone and the metering zone does not always coincide with the concentration in the aqueous medium phase of the resulting dispersion.

The ratio of the amount of olefin resin to the amount of partially saponified polyvinyl alcohol in the aqueous dispersions formed in this invention can be varied over a wide range. It is generally in a range of from 97/3 to 70/30, and preferably from 95/5 to 80/20, as the ratio by weight of olefin resin/partially saponified polyvinyl alcohol. Accordingly, the olefin resin and the aqueous solution of partially saponified polyvinyl alcohol are continuously fed respectively so as to obtain the desired ratio in the above-described range. Moreover, a ratio of the amount of the olefin resin to that of water in the formed dispersion can be varied in a wide range. Namely, in the resulting aqueous dispersions, the olefin resin in the component (A) is 100 parts by weight, the partially saponified polyvinyl alcohol of the component (B) is from 2 to 35 parts by weight, and preferably from 5 to 15 parts by weight, and water of the component (C)

is from 30 to 1000 parts by weight, and preferably from 70 to 500 parts by weight.

If the ratio of the component (B) to the component (A) is less than 2% by weight, it is difficult to obtain stabilized aqueous dispersions. If it exceeds 35% by weight, seal strength and tensile strength of the resulted film deteriorate.

The amount of water is from 30 to 1000 parts based on 100 parts by weight of the component (A). If it is outside of this range, stabilized aqueous dispersions can not be obtained. Generally, the aqueous dispersions are prepared so as to have 20 to 65% by weight of the resin content, and they are used directly or by diluting with water, as occasion demands, by users.

In addition to these components, it is possible to incorporate defoaming agents, viscosity regulators, anionic surface active agents, nonionic surface active agents, protective colloids such as carboxymethylcellulose or hydroxyethylcellulose, etc. and antioxidants for resins.

In the present invention, in order to lower the film-forming temperature of the aqueous dispersions, the resin particles of the component (A) are dispersed in water so as to have a $5\mu$ or less average particle size. From the viewpoint of the film-forming temperature, it is preferred that an amount of particles having $1\mu$ or less of the particle size in the resin particles is at least 10% by weight, and preferably is at least 50% by weight, based on the total weight of the resin particles.

Since the aqueous dispersions comprise a finely-divided resin having $5\mu$ or less of the average particle size in which the amount of particles having $1\mu$ or less of the particle size is 10%, it is possible to form thin coating films having $5\mu$ or so of the thickness.

Where the contents of each component in the aqueous dispersion resulted as described above depart from the composition range of the present invention, the composition is controlled by additionally adding required components or evaporating excess water by heating.

In the following description, the invention is illustrated in greater detail with reference to examples.

In the examples, all references to "%" and "part" are by weight, if not mentioned otherwise.

EXAMPLE 1

To the hopper of a co-rotating, intermeshing twin screw extruder (trade name: PCM 30, three-flighted screw less depth type, L/D=17, produced by Ikegai Tekkosho Co.), an ethylene-vinyl acetate copolymer (trade name: Evaflex P 3307, M.I.: 30, density: 0.96, vinyl acetate content: 33% by weight, produced by Mitsui Polychemical Co.) was continuously fed at a rate of 80 parts by weight/hour. From a feed inlet ($a_1$ in the drawing) provided on the vent part of the compression zone of the above-described extruder, a 20 wt % aqueous solution of partially saponified polyvinyl alcohol (trade name: Gosenol KH-17, saponification value: 80 mol %, produced by Nippon Synthetic Chemical Industry Co., Ld.) was continuously fed at a rate of 100 parts by weight/hour by pressuring by means of a plunger pump (discharge pressure: 3 Kg/cm G), while the mixture was continuously extruded at 90° C. (Cylinder temperature, the same meaning hereinafter).

The resulted extrusion product was a milk-white homogeneous dispersion in which the particle size of the resin was $1\mu$ or less.

COMPARISON 1

When extrusion at a heating temperature of 90° C. was attempted by feeding a mixture composed of 33 parts by weight of the same ethylene-vinyl acetate copolymer, 5 parts by weight of the same partially saponified polyvinyl alcohol and 50 parts by weight of water to the same extruder as those in Example 1, a useful dispersion could not be obtained, because the ethylene-vinyl acetate copolymer and the partially saponified polyvinyl alcohol could not be well mixed because of mutual adhesion thereof and continuous feeding at a fixed rate to the extruder could not be carried out.

COMPARISON 2

The aqueous solution of partially saponified polyvinyl alcohol was fed to a vent part of the extruder at a normal pressure without using the plunger pump used in Example 1, and the same procedure was carried out as in Example to continuously extrude.

As the result, the aqueous solution of partially saponified polyvinyl alcohol was hardly fed to the extruder and, consequently, the resulted extrusion product was not an aqueous dispersion.

COMPARISON 3

Continuous extrusion was carried out by the same manner as in Example 1 except that partially saponified polyvinyl alcohol having 96 mol % of the maximum saponification value (trade name: Goseno C-500, produced by Nippon Synthetic Chemical Industry Co., Ltd.) was used instead of the partially saponified polyvinyl alcohol used in Example 1.

In the resulted extrusion product, the copolymer resin was separated from water and a milk-white homogeneous aqueous dispersion was not obtained.

EXAMPLE 2

To the hopper of the same extruder as in Example 1, a mixture composed of 98 parts by weight of the same ethylene-vinyl acetate copolymer and 2 parts by weight of the same partially saponified polyvinyl alcohol was continuously fed at a rate of 100 parts by weight/hour. From a feed inlet provided on a vent part of the same extruder, a 4 wt % aqueous solution of the same partially saponified polyvinyl alcohol was in Example 1 was continuously fed at a rate of 50 parts by weight/hour by pressuring by means of a plunger pump (discharge pressure: 2 $Kg/cm^2G$), while the mixture was continuously extruded at 90° C. of the heating temperature.

The resulting extrusion product was milk-white homogeneous dispersion in which the average particle size of the resin was about $2\mu$.

COMPARISON 4

Continuous extrusion was carried out in the same manner as in Example 2, except that the aqueous solution of partially saponified polyvinyl alcohol was fed to the extruder at a normal pressure without using the plunger pump in Example 2.

As the result, the aqueous solution of partially saponified polyvinyl alcohol was hardly fed into the extruder and, consequently, the dispersion was not obtained at all.

COMPARISON 5

Continuous extrusion was carried out in the same manner as in Example 2, except that partially saponified polyvinyl alcohol having 96 mol % of the maximum saponification value (the same as that of Comparison 3) was used instead of the partially saponified polyvinyl alcohol in Example 2.

In the resulted extrusion product, the resin was separated from water, and a milk-white homogeneous aqueous dispersion was not obtained.

EXAMPLE 3

To the hopper of the same extruder as in Example 1, a mixture composed of 70 parts by weight of low-density polyethylene (trade name: YH-50, M.I.=2, specific gravity: 0.924, produced by Mitsubishi Petro-Chemical Co., Ltd.) and 30 parts by weight of a thermoplastic petroleum resin (trade name: Escorez 2101, specific gravity: 1.022, weight average molecular weight: 925, produced by Esso Co.) was continuously fed at a rate of 85 parts by weight/hour. To the vent part of the same extruder, a 10 wt % aqueous solution of partially saponified polyvinyl alcohol (trade name: Gosenol GH-17, saponification value 88 mol %, produced by Nippon Synthetic Chemical Industry Co., Ltd.) was continuously fed at a rate of 150 parts by weight/hour by pressuring by means of a plunger pump (discharge pressure: 8 Kg/cm$^2$G), while the mixture was extruded continuously at 150° C. of the heating temperature.

The resulting extrusion product was a milk-white homogeneous aqueous dispersion in which the particle size of the resin was 1$\mu$ or less.

EXAMPLE 4

Continuous extrusion was carried out in the same manner as in Example 3, except that a maleic acid anhydride grafted ethylene-vinyl acetate copolymer (maleic acid anhydride content: 0.9% by weight, M.I.: 6, vinyl acetate content: 20% by weight) was used instead of the low-density polyethylene used in Example 3 and the discharge pressure of the plunger pump was 7 Kg/cm$^2$G (gauge).

The resulting extrusion product was a milk-white homogeneous aqueous dispersion in which the particle size of the resin was 4$\mu$ or less.

EXAMPLE 5

Continuous extrusion was carried out in the same manner as in Example 3, except that an ethylene-propylene copolymer (trade name: Tafmer PO 280, Mooney viscosity: 20.5, propylene content: 27% by weight, produced by Mitsui Petro-Chemical Co., Ltd.) was used instead of the low-density polyethylene used in Example 3.

The resulted extrusion product was a milk-white homogeneous aqueous dispersion in which the particle size of the resin was 0.5$\mu$ or less.

EXAMPLE 6

To the hopper of a co-rotating, intermeshing type twin screw extruder (trade name: PCM 65, L/D: 30, diameter of screws: 65 mm, vent opening: 2, produced by Ikegai Tekko Co.), the same ethylene-vinyl acetate copolymer as in Example 1 was continuously fed at a rate of 80 parts by weight/hour. To the first feed inlet ($a_1$ in the drawing) on the vent part of the compression zone of the above-described extruder, an aqueous solution of partially saponified polyvinyl alcohol (the same as that used in Example 1) having 60% by weight of the concentration was continuously fed at a rate of 30 parts by weight/hour by pressuring by means of a plunger pump (discharge pressure: 3 Kg/cm$^2$G). At the same time, the aqueous solution of the same partially saponified polyvinyl alcohol having the same concentration as described above was continuously fed to the second feed inlet ($a_2$ in the drawing) on the vent part of the metering zone of the above-described extruder at a rate of 70 parts by weight/hour by pressuring by means of the same plunger pump, while the mixture was continuously extruded at 90° C. of the heating temperature.

The resulting extrusion product was a milk-white homogeneous dispersion in which the particle size of the resin was 0.5$\mu$ or less.

EXAMPLE 7

Continuous extrusion was carried out by the same manner as in Example 2, except that the aqueous solution of partially saponified polyvinyl alcohol was fed from a feed inlet ($a_2$ in the drawing) of the kneading disc part having 25 Kg/cm$^2$ of the resin pressure in the compression zone and the discharge pressure of the plunger pump was 30 Kg/cm$^2$G.

The resulting extrusion product was a milk-white homogeneous dispersion in which the particle size of the resin was 0.5$\mu$ or less.

COMPARISON 6

In order to produce an aqueous dispersion of the ethylene-vinyl acetate copolymer, the same procedure was carried out as in Example 1, except that a single screw extruder (40 mm, produced by Thermoplastic Co.) was used as the extruder. However, feeding of the aqueous solution of partially saponified polyvinyl alcohol could not be satisfactorily carried out and, consequently, a homogeneous dispersion could not be obtained.

EXAMPLE 8

To the hopper of a co-rotating, intermeshing type twin screw extruder (trade name: PCM 30, three flighted, less depth type, L/D: 17, produced by Ikegai Tekko Co.), ethylene-vinyl acetate copolymer pellets (#Ultracene UE-720 produced by Toyo Soda Co., Ltd., MFR: 150 g/10 minutes, melting point: 84° C., vinyl acetate content: 28% by weight) were continuously fed at a rate of 80 parts/hour. Further, a 20 wt % aqueous solution of partially saponified polyvinyl alcohol (Test sample: Kuraray Poval, produced by Kuraray Co., Ltd., saponification value: 75% by mol, degree of polymerization: 2050, melting point (Tm): 168° C.) was continuously fed from a feed inlet provided on the vent part of the compression zone of the above-described extruder at a rate of 100 parts/hour by pressure by means of plunger pump (discharge pressure: 3 Kg/cm$^2$G), while the mixture was continuously extruded at a temperature of 90° C.

The resulted extrusion product was a milk-white homogeneous dispersion in which the average particle size of the resin was 1$\mu$ or less.

Further, the content of resin particles having 1$\mu$ or less was 60%.

This aqueous dispersion (resin: 100 parts, partially saponified polyvinyl alcohol: 15 parts, and water: 50 parts) was evaluated by the following manner.

Results are shown in Table 1.

Stability 100 cc of the aqueous solution was put in a 200 ml beaker and preserved at 20° C. and 55.7 RH% in an air-conditioned room. "Good" means that separation of the aqueous phase and the resin phase was not observed after the preservation.

Minimum film-forming temperature (MFT)

On a stainless steel plate having a temperature gradient of a thermal gradient testing apparatus Type II produced by Yoshimitsu Kagakukikai Co., the aqueous dispersion was distributed so as to obtain a coating film having a 200μ thickness and dried. After drying, the stainless steep plate was observed, and the minimum temperature at which a transparent continuous film was formed was shown as MFT.

Tensile strength

Measurement by JIS K-6781-1965 (20° C.).

Blocking

Measurement by JIS K-6842 (adhesive blocking temperature).

Particle size of resin

The aqueous dispersion was photographed by a scanning electron microscope. The particle size was measured by the resulted photograph and the average particle size was calculated thereby.

EXAMPLE 8 AND COMPARISON 6

Aqueous dispersions having properties shown in Table 1 were prepared by the same manner as in Example 1, except that the kind of ethylene-vinyl acetate copolymer (referred to as EVA, hereinafter) the mixing amount of partially saponified polyvinyl alcohol (PVA): Karaypoval PVA 420 (saponification value: 80%, degree of polymerization: 2000, Tm: 174° C.) (the value in the table is the amount based on EVA 100 parts and water 50 parts in the resulted aqueous dispersion) and the extrusion temperature were varied as shown in Table 1.

It is understood from Table 1 that aqueous dispersions which form a film having a low film-forming temperature and excellent balance in tensile strength and blocking are prepared when the used ethylene-vinyl acetate copolymer has 20% or more of the vinyl acetate content, the melt flow ratio (MFR) is 30 g/10 minutes or more and the amount of partially saponified polyvinyl alcohol is 2 to 35 parts based on 100 parts of ethylene-vinyl acetate copolymer.

Further, if the amount is less than 2 parts, dispersion is difficult to carry out. If the amount is more than 35 parts, the tensile strength of the formed coating film causes trouble on practical use.

EXAMPLE 9

Aqueous dispersions were obtained in the same manner as in Example 8, except that partially saponified polyvinyl alcohol in which residual acetic acid groups were distributed in random [#Gosenol KH-20 (saponification value: 80%, degree of polymerization: 2000, TM: 158° C.)] was used as the partially saponified polyvinyl alcohol. Results are shown in Table 1.

It can be understood from these results that the partially saponified polyvinyl alcohol in which residual acetic acid groups are distributed in a blocked state shows excellent film-forming ability in spite of having a high melting point as compared with partially saponified polyvinyl alcohol in which residual acetic acid groups are distributed randomly.

TABLE 1

| Test No. | EVA MFR (g/10 minutes) | EVA VAc* content (%) | EVA Melting point (C) | PVA Mixing amount (%) | Temperature of extrusion (C) |
|---|---|---|---|---|---|
| Example 8** | | | | | |
| 1 | 150 | 28 | 84 | 15 | 90 |
| 2 | 150 | 20 | 94 | 15 | 100 |
| 3 | 75 | 40 | 73 | 15 | 90 |
| 4 | 30 | 32 | 82 | 15 | 90 |
| 5 | 400 | 28 | 83 | 15 | 90 |
| 6 | 150 | 28 | 84 | 2 | 90 |
| 7 | 150 | 28 | 84 | 5 | 90 |
| 8 | 150 | 28 | 84 | 10 | 90 |
| 9 | 150 | 28 | 84 | 20 | 90 |
| 10 | 150 | 28 | 84 | 30 | 90 |
| 11 | 150 | 20 | 94 | 10 | 100 |
| Example 9** | | | | | |
| 12 | 150 | 28 | 84 | 15 | 90 |
| 13 | 150 | 20 | 94 | 15 | 100 |
| 14 | 75 | 40 | 73 | 15 | 90 |
| 15 | 150 | 28 | 84 | 5 | 90 |
| 16 | 150 | 28 | 84 | 10 | 90 |
| Comparison 6*** | | | | | |
| | 150 | 28 | 84 | 1 | 90 |
| | 150 | 28 | 84 | 40 | 90 |

| Test No. | Aqueous Dispersion Average particle size (μ) | Stability | MFT (C) | Tensile strength (kg/cm) | Blocking Property (C) |
|---|---|---|---|---|---|
| Example 8** | | | | | |
| 1 | 1 | Good | 25 | 45 | 58 |
| 2 | 1 | Good | 30 | 50 | 63 |
| 3 | 1 | Good | 20 | 55 | 43 |
| 4 | 1 | Good | 25 | 77 | 48 |
| 5 | 1 | Good | 25 | 25 | 53 |
| 6 | 1 | Good | 35 | 50 | 53 |
| 7 | 1 | Good | 30 | 48 | 58 |
| 8 | 1 | Good | 25 | 43 | 58 |
| 9 | 0.5 | Good | 20 | 37 | 63 |
| 10 | 0.5 | Good | 20 | 37 | 68 |
| 11 | 1 | Good | 30 | 53 | 63 |
| Example 9** | | | | | |
| 12 | 2 | Good | 45 | 47 | 58 |
| 13 | 2 | Good | 55 | 49 | 63 |
| 14 | 3 | Good | 40 | 55 | 43 |
| 15 | 3 | Good | 55 | 48 | 58 |
| 16 | 2 | Good | 60 | 41 | 58 |
| Comparison 6*** | | | | | |
| | 75 | Inferior | 75 | 50 | 53 |
| | 0.5 | Good | 20 | 18 | 48 |

*VAc: Vinyl acetate content.
**Residual acetic acid groups in PVA used are blocked.
***Residual acetic acid groups in PVA used are distributed in random.

EXAMPLE 10

Aqueous dispersions having properties shown in Table 2 were prepared in the same manner as in Example 8, except that PVA shown in Table 2 was used, and the feed amounts of PVA and water in the resulted aqueous dispersion was 100 parts, 10 parts, and 50 parts, respectively.

The melting point (Tm) of PVA was measured by means of a Hitachi Perkin Elmer DSC-type II measuring device in a nitrogen atmosphere at 40° C./minute of the temperature raising rate after the sample PVA was dried under 10 mmHg at 130° C. for one hour. An endothermic peak temperature was recorded as the melting point.

Reference example: Comparison with available dispersions

Mechanical stability

The aqueous dispersion: Test No. 8 in Example 8 and an available aqueous emulsion of ethylene-vinyl acetate copolymer were stirred respectively by means of Maron tester produced by Shinsei Sangyo Co. at 1000 rpm under 20 Kg of load at 20° C. After stirred for 20 minutes, the aqueous dispersions were quickly passed through a wire gauze of 120 JIS mesh, and the percentage by weight of coherent EVA particles on the wire gauze was calculated.

The percentage in the dispersion of the invention was 0.1% by weight or less, while that in the available emulsion was about 3% by weight.

It is understood from this result that the aqueous dispersion of the invention has excellent mechanical stability, because resin particles cause less cohesion even if the dispersion is mechanically stirred.

Thermal stability

When a blocking property of the acqueous dispersions of the present invention (Examples 8-10) was measured according to JIS K-6842, they showed cohesive blocking at 20° C. Further, temperature of adhesive blocking was as shown in Tables 1 and 2.

On the other hand, the aqueous emulsion produced by the following process for polymerization had a film-forming temperature (MFT) of 0° C., which showed adhesive blocking at room temperature, by which separation of particles was difficult to carry out.

Process for polymerization

After 100 g of vinyl acetate monomer, 10 g of PVA (Kuraray poval PVA 420), 200 g of ion-exchange water and 0.05 g of benzoyl peroxide were put in a 1 liter autoclave, polymerization was carried out by feeding ethylene monomer at 25 atms. of the pressure to the autoclave with stirring at 70° C. for 5 hours to obtain an aqueous emulsion of ethylene-vinyl acetate copolymer having 87% of the vinyl acetate content.

pH stability

To aqueous dispersions of Examples 8-10 and the available EVA aqueous emulsion (non-volatile 44.5%, viscosity (77° F.) 600 cps and pH 9.2), diluted aqueous solution of hydrochloric acid or caustic soda was added to change the pH of the system to 2-12. All of the aqueous dispersions of the present invention were stable at any pH. However, the available EVA aqueous emulsion was stable at pH 6-12, but caused cohesion at an acid region of pH 6 or less, e.g., 70% at pH 4 and 100% (complete gelation) at pH 2.

EXAMPLE 11

To the hopper of a co-rotating, intermeshing type twin screw extruder (TEM-50 produced by Toshiba Kikai Co., L/D: 37), the polyolefin resin shown in Table 3 was continuously fed at a rate per hour shown in Table 3. Further, partially saponified polyvinyl alcohol shown in Table 3 was continuously fed as an aqueous solution from a feed inlet provided on the vent part of the compression zone of the above-described extruder at a rate per hour shown in Table 3 by pressuring by means of a plunger pump (discharge pressure: 7 Kg/cm$^2$G), while the mixture having the composition shown in Table 3 was continuously extruded by conditions shown in Table 3.

The resulted extrusion product was a milk-white homogeneous aqueous dispersion. Properties of the dispersion are as shown in Table 3.

It is understood from the results that partially saponified polyvinyl alcohol in which residual acetic acid groups are distributed as a blocked state shows excellent film-forming ability in spite of having a high melting point as compared with partially saponified polyvinyl alcohol in which residual acetic acid groups are distributed in random.

TABLE 3

| | Polyolefin resin | | | | |
|---|---|---|---|---|---|
| Test No. | Kind | MFB (g/10 minutes) | Density (g/cm$^3$) | Mooney viscosity (100° C. ML 1 + 4) | Mixing amount (parts by weight) |
| 1 | Low-density polyethylene | 45 | 0.918 | — | 100 |
| 2 | Low-density polyethylene | 45 | 0.918 | — | 100 |
| 3 | Low-density polyethylene | 45 | 0.918 | — | 100 |
| 4 | Low-density polyethylene | 200 | 0.916 | — | 100 |
| 5 | Low-density polyethylene | 45 | 0.918 | — | 100 |
| 6 | Low-density polyethylene | 45 | 0.918 | — | 100 |
| 7 | Low-density polyethylene | 45 | 0.918 | — | 100 |
| 8 | Ethylene-propylene copolymer rubber | — | — | 25*4 | 100 |
| 9 | Ethylene-propylene copolymer rubber | — | — | 15*4 | 100 |
| 10 | Ethylene-propylene copolymer rubber | — | — | 25*3 | 100 |
| 11 | Ethylene-propylene copolymer rubber | — | — | 25*3 | 100 |

TABLE 2

| | PVA | | | Aqueous dispersion | | | | |
|---|---|---|---|---|---|---|---|---|
| Test No. | Saponification value (% by mol) | Melting point (°C.) | Degree of polymerization | Average particle size of resin (μ) | Stability | MFT (°C.) | Tensile strength (kg/cm$^3$) | Blocking property (°C.) |
| 1 | 81 | 184 | 2000 | 1 | Good | 25 | 49 | 58 |
| 2 | 75 | 168 | 2000 | 1 | Good | 23 | 50 | 58 |
| 3 | 70 | 165 | 2000 | 1 | Good | 20 | 51 | 58 |
| 4 | 98 | 215 | 2000 | 5 | Good | 84 | 27 | 58 |
| 5 | 88 | 193 | 2000 | 1 | Good | 70 | 25 | 58 |
| 6** | 70 | 152 | 2000 | 1.5 | Good | 50 | 48 | 56 |

**Residual acetic acid groups in PVA are distributed in random. (No mark means blocked PVA)

TABLE 3-continued

| Test No. | Name | | Mixing amount (parts by weight) |
|---|---|---|---|
| 12 | Low-density polyethylene | 45 0.918 — | 100 |
| 13 | Low-density polyethylene | 45 0.918 — | 100 |
| 14 | Low-density polyethylene | 45 0.918 — | 100 |
| 15 | Ethylene-propylene compolymer rubber | — — 25*3 | 100 |

| | Partially saponified polyvinyl alcohol | | | | |
|---|---|---|---|---|---|
| Test No. | Name | Saponification value (% by mol) | Melting point (°C.) | Degree of polymerization | Mixing amount (parts by weight) |
| 1 | Kurary poval PVA420* | 80 | 174 | 2,000 | 10 |
| 2 | Kuraray poval Test Sample* | 75 | 168 | 2,000 | 10 |
| 3 | Kuraray poval Test Sample* | 70 | 165 | 2,000 | 10 |
| 4 | Kuraray poval PVA420* | 80 | 174 | 2,000 | 10 |
| 5 | Kuraray poval PVA420* | 80 | 174 | 2,000 | 3 |
| 6 | Kuraray poval PVA420* | 80 | 174 | 2,000 | 20 |
| 7 | Kuraray poval PVA420* | 80 | 174 | 2,000 | 30 |
| 8 | Kuraray poval PVA420* | 80 | 174 | 2,000 | 10 |
| 9 | Kuraray poval PVA420* | 80 | 174 | 2,000 | 10 |
| 10 | Kuraray poval PVA420* | 80 | 174 | 2,000 | 3 |
| 11 | Kuraray poval PVA420* | 80 | 174 | 2,000 | 30 |
| 12 | Gosenol KH-20** | 80 | 158 | 2,000 | 10 |
| 13 | Gosenol Test Sample** | 70 | 152 | 2,000 | 10 |
| 14 | Kuraray poval PVA420* | 80 | 174 | 2,000 | 40 |
| 15 | Gosenol KH-20** | 80 | 158 | 2,000 | 10 |

| Test No. | Temperature of Extrusion (°C.) | Aqueous dispersion Average particle size ($\mu$) | Stability | MFT (°C.) | Coating film Tensile strength (kg/cm$^2$) |
|---|---|---|---|---|---|
| 1 | 130 | 1.5 | Good | 37 | 75 |
| 2 | 130 | 2 | Good | 38 | 77 |
| 3 | 130 | 2 | Good | 39 | 82 |
| 4 | 130 | 1 | Good | 35 | 45 |
| 5 | 150 | 4 | Good | 43 | 85 |
| 6 | 150 | 1 | Good | 36 | 70 |
| 7 | 150 | 1 | Good | 33 | 60 |
| 8 | 150 | 3 | Good | 30 or less | 15 |
| 9 | 150 | 3 | Good | 30 or less | 15 |
| 10 | 150 | 3 | Good | 30 or less | 20 |
| 11 | 150 | 3 | Good | 30 or less | 12 |
| 12 | 150 | 3 | Good | 70 | 43 |
| 13 | 150 | 4 | Good | 68 | 47 |
| 14 | 150 | 1.5 | Good | 30 or less | 40 |
| 15 | 150 | 3 | Good | 53 | 10 or less |

*Residual acetic acid groups in PVA used are blocked.
**Residual acetic acid groups in PVA used are distributed in random.
Propulene content (% by weight): *3 = 28, *4 = 26

EXAMPLE 12

Aqueous emulsions were obtained with using compositions shown in Table 4 by means of a twin compounding extruder TEM-50 produced by Toshiba Kitai Co., and the minimum film-forming temperature of the resulted emulsions was measured.

Results are shown in Table 4, together with the strength of the coated films.

COMPARISION 7

20 g of low-density polyethylene (MFR 45 g/10 minutes, density: 0.918) used in Example 11 as Test No. 1 was dissolved in 2 liters of cyclohexane at 70° C., and 4 g of nonionic surface active agent (Noigen EA-143, produced by Daiichi Kogyo Seiyaku Co.) was added thereto. Water at 70° C. was slowly added to the resulted solution with stirring at 8000 rpm by means of a homomixer (Type HV-M, produced by Tokushu Kika Kogyo Co.) to prepare a milk-white aqueous dispersion. When an aqueous dispersion was obtained by removing the solvent from the emulsion, the average particle size was 0.5$\mu$ and the amount of particles having 1$\mu$ less of the particle size was 50% or more. Measurement of the minimum film-forming temperature of this emulsion and strength of the coating film was carried out. Results are shown in Table 4.

TABLE 4

| Test No. | Polyolefin resin Resin | Grade index | Mixing amount (parts by weight) |
|---|---|---|---|
| 1* | Low-density polyethylene | MFR 45g/10 min. Density: 0.918g/cm$^3$ | 100 |
| 2** | Low-density polyethylene | MFR 45g/10 min. Density: 0.918g/cm$^3$ | 100 |
| 3* | High-density polyethylene | MFR 20g/10 min. Density: 0.956g/cm$^3$ | 100 |
| 4** | High-density polyethylene | MFR 20g/10 min. Density: 0.956g/cm$^3$ | 100 |
| 5* | Ethylene-butene copolymer | MFR 20g/10 min. Butene content 15 wt.% | 100 |
| 6* | Ethylene-butene copolymer | MFR 20g/10 min. Butene content 15 wt.% | 100 |
| 7* | Ethylene-propylene rubber | Propylene content 28 wt% Mooney viscosity 27 | 100 |
| 8** | Ethylene-propylene rubber | Propylene content 28 wt% Mooney viscosity 27 | 100 |
| Comparison 7 | Low-density polyethylene | MFR 45g/10 min. Density 0.918g/cm$^3$ | 100 |

| Test No. | Partially saponified polyvinyl alcohol Saponification value | Tm (°C.) | Degree of Polymerization | Mixing amount (parts by weight) |
|---|---|---|---|---|
| 1* | 88 | 193 | 2,000 | 15 |
| 2** | 88 | 173 | 2,000 | 15 |
| 3* | 80 | 174 | 2,000 | 15 |
| 4** | 80 | 158 | 2,000 | 15 |
| 5* | 80 | 174 | 2,000 | 15 |
| 6* | 80 | 158 | 2,000 | 15 |
| 7* | 88 | 193 | 2,000 | 15 |
| 8** | 88 | 173 | 2,000 | 15 |
| Comparison 7 | Nonionic surface active agent: Noigen EA-143 | | | 20 |

| Test No. | Water Mixing amount (parts by weight) | Temperature of extrusion (°C.) | Quality of emulsion MFT (°C.) | Tensile strength of coating film (kg/cm$^2$) |
|---|---|---|---|---|
| 1* | 50 | 130 | 37 | 73 |
| 2** | 50 | 130 | 75 | 40 |
| 3* | 50 | 150 | 65 | 210 |
| 4** | 50 | 150 | 115 | 175 |
| 5* | 50 | 130 | 30 or less | 170 |
| 6* | 50 | 130 | 45 | 100 |
| 7* | 50 | 150 | 23 | 20 |

TABLE 4-continued

| 8** | 50 | 150 | 75 | 10 or less |
|---|---|---|---|---|
| Comparison 7 | — | — | 110 | 25 |

*partially saponified polyvinyl alcohol in which residual acetic acid groups are blocked.
**Partially saponified polyvinyl alcohol in which residual acetic acid groups are distributed in random.

While the invention has been described in detail and with reference to specific embodiments thereof, it will be apparent to one skilled in the art that various changes and modifications can be made therein without departing from the spirit and scope thereof.

What is claimed is:

1. A process for continuously preparing a homogeneous aqueous dispersion of olefin resin which comprises continuously feeding said olefin resin into a hopper of a multi-screw extruder having at least two screws in the compression zone thereof, continuously feeding an aqueous solution of partially saponified polyvinyl alcohol having from about 65 to 95 mol% of the maximum saponification value under pressure to at least one feed inlet provided in at least one of a compression zone and a metering zone of said extruder which are separate from said hopper, wherein said olefin resin is heated and mixed in said extruder and said aqueous solution is subsequently mixed therewith.

2. A process according to claim 1, wherein said multi-screw extruder is a twin screw extruder.

3. A process according to claim 1, wherein the aqueous solution of partially saponified polyvinyl alcohol is fed to a highly kneading part of the compression zone at a pressure of at least 20 kg/cm² of the resin pressure.

4. A process according to claim 1, 2 or 3, wherein the partially saponified polyvinyl alcohol has from 70 to 90 mol% of the maximum saponification value, and the melting point (Tm, in °C.) of said partially saponified polyvinyl alcohol satisfies the formula $0.50x+179 \geq Tm \geq 1.18x+73$ when the saponification value is x%.

5. An aqueous dispersion of olefin resin comprising (A) ethylene-vinyl acetate copolymer resin particles having an average particle size of 5 microns or less, (B) partially saponified polyvinyl alcohol and (C) water, wherein component (B) is mixed in an amount of from 2 to 35 parts by weight and component (C) is mixed in an amount of from 30 to 1000 parts by weight, based on 100 parts by weight of the resin particles of component (A), and wherein resin A satisfies the following requirements (a), (b) and (c):
   (a) the melt flow ratio of the resin of the component (A) measured by ASTM D-1238 is 30 g/10 minutes, or more,
   (b) the vinyl acetate content in the resin of the component (A) from 15 to 40% by weight, and
   (c) the saponification value, x%, of the partially saponified polyvinyl alcohol of the component (B) is from 70 to 90 mol% and the melting point (Tm, in °C.) of said partially saponified polyvinyl alcohol satisfies the formula $0.50x+179 \geq Tm \geq 1.18x+73$.

6. A process for continuously preparing an aqueous dispersion of olefin resin as in claim 1, 2, or 3, wherein the olefin resin is selected from the group consisting of low-density polyethylene, middle-density polyethylene, high-density polyethylene, ethylene-vinyl acetate copolymer, ethylene-acrylic acid copolymer, metal salts of ethylene-acrylic acid copolymer, ethylene-methacrylic acid copolymer, ethylene-arcylic acid ester copolymer, ethylene-methacrylic acid ester copolymer, ethylene-propylene copolymer, atactic polypropylene, isotactic polypropylene, propylene-1-butene copolymer, ethylene-propylene-dicyclopentadiene copolymer, ethylene-propylene-ethylideneorbornane copolymer, and mixtures of said copolymers.

7. A process for continuously preparing an aqueous dispersion of olefinic resin as in claim 1, 2, or 3, wherein the aqueous solution of partially saponified polyvinyl alcohol is fed under pressure to a feed inlet provided in the compression zone.

8. A process according to claim 1, 2, or 3, wherein the olefin resin is an ethylenic resin having a melt flow ratio of 30 g/10 minutes or more measured according to ASTM D-1238-70.

9. An aqueous dispersion of olefin resin as in claim 5, wherein the ratio of the amount of olefin resin to the amount of partially saponified polyvinyl alcohol is from 97/3 to 70/30.

10. An aqueous dispersion of olefin resin as in claim 9, wherein the ratio of the amount of olefin resin to the amount of partially saponified polyvinyl alcohol is from 95/5 to 80/20.

11. An aqueous dispersion of olefin resin as in claim 5, wherein the component (B) is mixed in an amount from 5 to 15 parts by weight.

12. An aqueous dispersion of olefin resin as in claim 5, wherein the component (C) is mixed in an amount from 70 to 500 parts by weight.

13. An aqueous dispersion of olefin resin as in claim 5, 9, 10, 11, Or 12, wherein at least 10% by weight of the resin particles have an average particle size of 1μ or less, based on the total weight of a resin particle.

14. An aqueous dispersion of olefin resin as in claim 13, wherein at least 50% by weight of the resin particles have an average particle size of 1μ or less, based on the total weight of a resin particle.

15. The process of claim 1 wherein said extruder has an L/D ratio of 15 or more where L is the effective length of a screw of the extruder and D is the effective inner diameter of the extruder barrel.

16. The process of claim 1 wherein said partially saponified polyvinyl alcohol is present in an amount of from 2 to 35 parts by weight per 100 parts by weight of said olefin resin, and further wherein said olefin resin is an ethylene vinyl acetate copolymer having a melt/flow ratio measured by ASTM D-1238 of 30 g/10 mins. or more and wherein the vinyl acetate content of the ethylene vinyl acetate copolymer is from 15 to 40 percent by weight, balance ethylene.

17. The process of claim 1 wherein said extruder is a co-rotating, intermeshing twin screw extruder.

18. The process of claim 1 wherein said extruder is is a counter-rotating, intermeshing twin screw extruder.

19. The process of claim 1 wherein said extruder is a counter-rotating, non-intermeshing twin screw extruder.

20. The process of claim 1 wherein substantially no organic solvent is present in said aqueous solution or said olefin resin, whereby no organic solvent removal step is necessary in said continuous processing to form said homogeneous aqueous dispersion of olefin resin.

* * * * *